(12) United States Patent
Bigioi et al.

(10) Patent No.: US 7,747,596 B2
(45) Date of Patent: Jun. 29, 2010

(54) SERVER DEVICE, USER INTERFACE APPLIANCE, AND MEDIA PROCESSING NETWORK

(75) Inventors: Petronel Bigioi, Galway (IE); Peter Corcoran, Claregalway (IE); Eran Steinberg, San Francisco, CA (US)

(73) Assignee: FotoNation Vision Ltd., Galway (IE)

( * ) Notice: Subject to any disclaimer, the term of this patent is extended or adjusted under 35 U.S.C. 154(b) by 273 days.

(21) Appl. No.: 11/156,235

(22) Filed: Jun. 17, 2005

(65) Prior Publication Data

US 2006/0288071 A1 Dec. 21, 2006

(51) Int. Cl.
*G06F 7/00* (2006.01)
*G06F 3/00* (2006.01)
*G06F 3/048* (2006.01)

(52) U.S. Cl. .................. 707/705; 707/805; 715/234; 715/738; 715/835; 725/37; 725/43

(58) Field of Classification Search .............. 707/100, 707/104.1, 705, 805; 715/234, 738, 835; 725/37, 43
See application file for complete search history.

(56) References Cited

U.S. PATENT DOCUMENTS

| | | | | |
|---|---|---|---|---|
| 5,500,700 A | * | 3/1996 | Massarsky | 348/E7.086 |
| 5,555,376 A | | 9/1996 | Theimer et al. | |
| 5,602,997 A | * | 2/1997 | Carpenter et al. | 715/764 |
| 5,727,135 A | * | 3/1998 | Webb et al. | 358/1.14 |
| 5,812,865 A | | 9/1998 | Theimer et al. | |
| 5,886,732 A | * | 3/1999 | Humpleman | 725/37 |
| 6,182,094 B1 | * | 1/2001 | Humpleman et al. | 707/10 |
| 6,184,998 B1 | * | 2/2001 | Tebeka | 358/1.15 |
| 6,275,144 B1 | * | 8/2001 | Rumbaugh | 725/130 |
| 6,591,069 B2 | * | 7/2003 | Horiguchi | 348/E5.026 |
| 6,697,090 B1 | * | 2/2004 | Nagasaka et al. | 715/769 |
| 6,725,281 B1 | * | 4/2004 | Zintel et al. | 709/217 |
| 6,779,004 B1 | | 8/2004 | Zintel | |
| 6,810,409 B1 | * | 10/2004 | Fry et al. | 709/202 |
| 7,039,727 B2 | * | 5/2006 | Camara et al. | 710/5 |
| 2002/0038372 A1 | | 3/2002 | Idehara et al. | |
| 2006/0149811 A1 | | 7/2006 | Bennett et al. | |
| 2008/0250239 A1 | | 10/2008 | Risan et al. | |

\* cited by examiner

*Primary Examiner*—Vincent Boccio
(74) *Attorney, Agent, or Firm*—Andrew V. Smith (57) ABSTRACT

Components for a control and data processing infrastructure for multiple networked media peripherals are based on chained device connections using a transport-layer independent asymmetric control protocol such as PTP. These components provide a user interface which mirrors the chain of device connections, provides remote access to the media data distributed across said connected devices, can respond to events originating from members of the device chain and enables control and management of the underlying media processing capabilities of the connected devices.

36 Claims, 7 Drawing Sheets

Fig 1: The Emerging Home Network Infrastructure for CE Appliances.

SERVER DEVICE, USER INTERFACE APPLIANCE, AND MEDIA PROCESSING NETWORK

RELATED APPLICATION

This application is related to a contemporaneously filed application Ser. No. 11/156,234, entitled, "Method for Establishing a Paired Connection Between Media Devices," by inventors Petronel Bigioi, Peter Corcoran, and Eran Steinberg, which is hereby incorporated by reference.

FIELD OF THE INVENTION

The invention relates to a server device, a user interface appliance and a media processing network, particularly including the server device and user interface appliance. The network comprises networked appliances, such as digital cameras and support appliances for analysis, management, post-processing, sorting, storage and/or printing of digital images, metadata and audio data associated with these images.

BACKGROUND

The Changing Home A/V Appliance Infrastructure

Traditionally our homes have been filled with stand-alone Consumer Electronic (CE) appliances such as the TV set or single add-on appliances such as the VCR or DVD player which allow us to record our favourite TV shows and play pre-recorded movies. However in the last few years we have seen the emergence of a new generation of digital CE appliances such as PVRs (personal video recorders such as TiVo, Sky+, etc) and Media Adapters (a Media Adapter is an appliance which can receive digital content over a network connection and convert it to standard RCA or S-Video output for presentation on a standard TV set).

Furthermore, multi-PC homes are now common and several new market segments have become established for specialized computer peripherals which can acquire, manage, process, sort, store, render and present digital content. Well established examples of such peripherals include MP3 players and digital cameras.

A further major catalyst is the emergence of 802.11 WLAN technology as a means of wireless home networking. The cost of 802.11g access points is rapidly falling below 100 Euro which will further drive the market for networked CE products as consumers begin to perceive the benefits and simplicity of these new wireless networking technologies. A transition from stand-alone CE products and computer peripherals to wireless networked appliances is believed by some to be now occurring.

Figure 1:
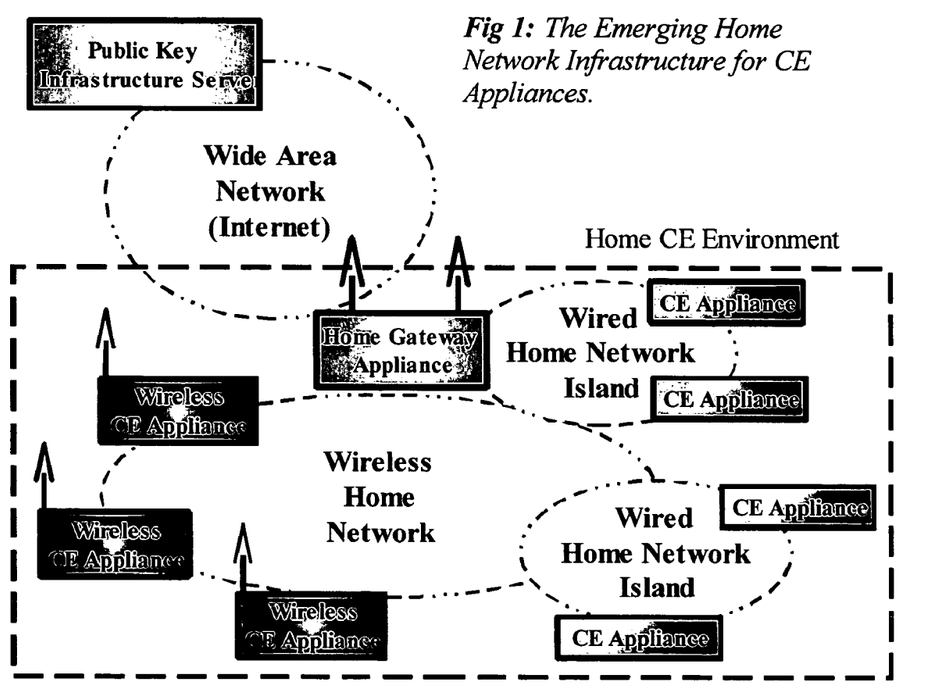
FIG. 1 illustrates a home network infrastructure.

FIG. 1 illustrates a home networking environment [101] that next-generation CE appliances [102, 104] may "live" in. According to FIG. 1, a local network of CE appliances will interoperate over wired islands [103] which are glued together by a global wireless 802.11 network [105]. This local network is connected, in turn, via a gateway appliance [108] to an external wide area network (WAN) [106], effectively the broadband connection to the home.

Home Networking Middleware Technologies

Next generation home networks may be based on TCP/IP networking technology. However there are additional layers of software infrastructure present in a home network. These additional software layers are used to support "configuration-free" networking of devices and to facilitate and support device interoperability. When CE devices are connected to a home network, they typically obtain an IP address automatically. This desktop computer networking service may be typically provided by a DHCP server. However a CE device preferably also advertises its capabilities to other devices on the network, obtains information on existing network devices & services which are relevant to its functionality and provides support for the user interface (UI) mechanisms supported by the home network. These additional software layers are collectively known as home networking middleware.

Home networking middleware known as Universal Plug & Play (UPnP) technology is incorporated in the latest versions of the Microsoft Windows OS. Universal Plug and Play is a distributed, open networking architecture that leverages TCP/IP and the Web technologies to enable seamless proximity networking in addition to control and data transfer among networked devices in the home, office, and public spaces. ["Universal Plug and Play Device Architecture", Version 1.0, Jun. 8, 2000, (c) 1999-2000 Microsoft Corporation, incorporated by reference herein.]

Figure 2A:
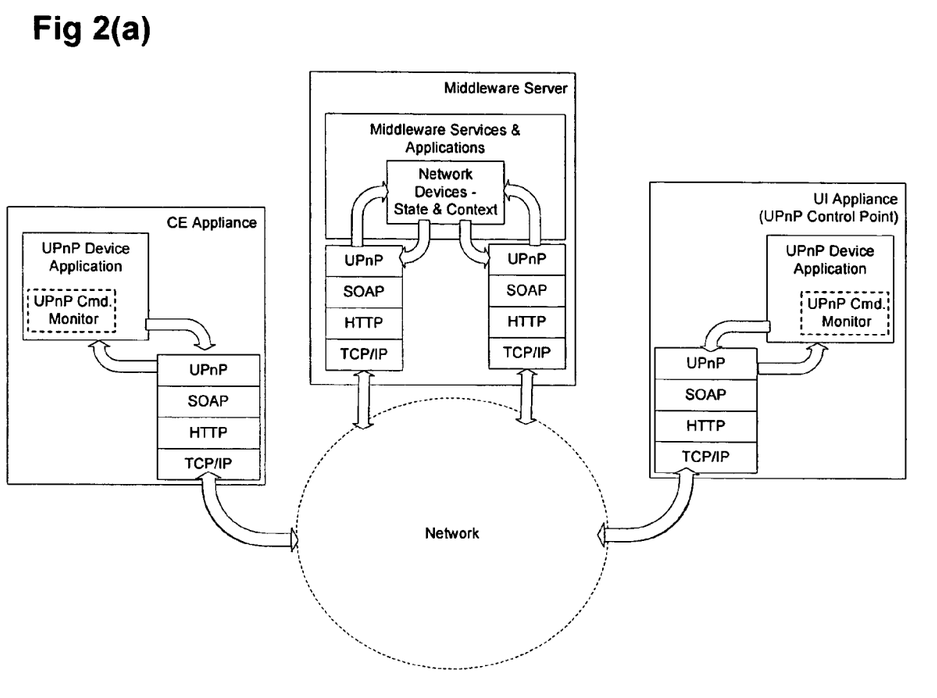
FIGS. 2(a) and 2(b) illustrate uPnP architecture.
Figure 2B:
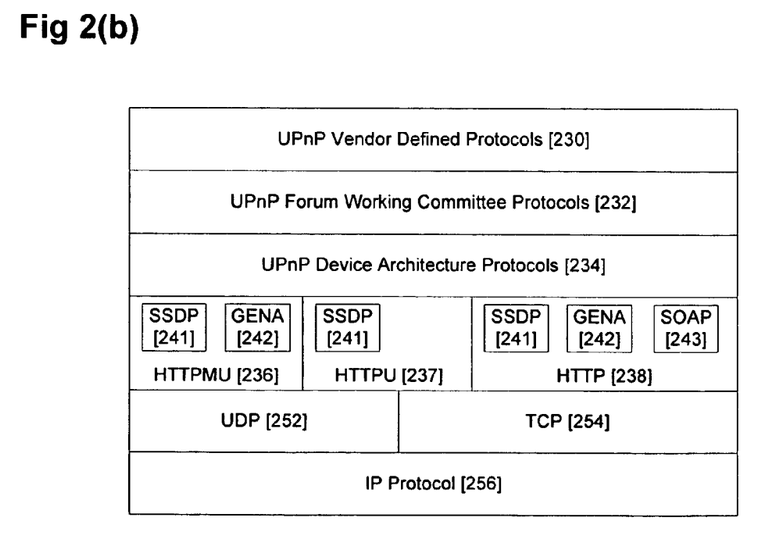

A protocol stack for UPnP is illustrated in FIG. 2. UPnP provides networking capabilities by using pre-existing network protocols and standards such as Internet protocol (IP), hyper text transportation protocol (HTTP), simple device discovery protocol (SDDP), simple object access protocol (SOAP), general event notification architecture (GENA), and extensible markup language (XML).

The UPnP standard specifies the control point (CP) which is used for controlling the operations of devices connected in the UPnP network. Communications between the devices and the UPnP CP take place by exchanging XML formatted messages. The user, however, does not need to be aware of the format and semantics of the messages because the UPnP network works seamlessly. The UPnP CP usually includes a user-friendly graphical user interface (GUI), normally with graphical buttons for easy access to the control functions of the devices.

Typically, a stack for a UPnP implementation includes six layers: addressing, discovery, description, control, eventing and presentation.

Addressing enables communication between networked devices using dynamic host configuration protocol (DHCP). In UPnP, a DHCP server assigns temporary IP addresses to hosts. This is known as dynamic allocation. Dynamic allocation allows sharing of a limited number of IP addresses among many hosts.

Discovery allows devices added to the UPnP network to "advertise" their presence to the control point. Discovery also allows control points to search for and discover devices. By utilizing a simple device discovery protocol (SDDP) and general event notification architecture (GENA), the control point can be made aware of available resources on the network and can update that information as needed.

Description enables the control point to "learn" how to access a device discovered on the UPnP network and to obtain a device description that indicates the services and functions offered by the device. The control point can retrieve the device and service information by sending an HTTP request using a Universal Resource Locator (URL) of the device obtained during discovery.

Control: The UPnP control point can control devices by sending HTTP requests to the devices using their URLs. The devices can notify the control point of a result by returning an HTTP response. The requests and responses are encapsulated using SOAP, and transmitted over the UPnP network.

Eventing: The UPnP control point can monitor the states of services provided by the UPnP devices. Using the GENA protocol, the control point can request notification of any change in states of the services. The control point sends the HTTP request to the device to subscribe to receive notification. The device sends an event message in response. Thereafter, the device sends notifications to the control point of any change in states of the services.

Presentation enables the control point to provide the user with an interface for controlling the devices on the network, as well as presenting status information for those devices. Typically, the graphical user interface provides the interface for the presentation.

Although home network middleware generally achieves the desired result of allowing automatic addition and configuration of devices on a home network, it can benefit from significant additional computing resources in order to implement a full UPnP protocol stack. Further, UPnP control points utilize certain processing power, graphical interface software, such as browsers, or a windowed GUI-based operating system, and the networking capability to act as control points of the UPnP network. However, those devices are generally costly, unsuitable to a common non-technical person, and non-portable. Further, those devices require a substantial amount of power to operate.

The Picture Transfer Protocol (PTP)

Recently, communication protocols have developed for allowing a computing device to control and communicate with media devices such as digital cameras. One such protocol, ISO 157540 Picture Transfer Protocol (PTP), incorporated into products of the Microsoft Corporation of Redmond, Wash., can be used in connection with transferring images from imaging devices, such as cameras, to personal computing devices. This protocol defines how the digital still camera can communicate with a personal computing device.

PTP Device Roles: The PTP protocol is an assymetric control protocol, somewhat like a master/slave protocol. However, in PTP parlance one refers to the devices engaged in a picture transfer as the Initiator and Responder, rather than the Master and Slave. The Initiator device establishes and subsequently manages a control connection while the Responder is defined as the device that responds to operation requests such as an "OpenSession" request.

Devices, in the PTP protocol model, can be Initiators, Responders or both. For instance, a PC can be configured only as an Initiator device while a USB camera can be only a Responder. Similarly, a Bluetooth camera, that opens a connection to a Bluetooth/PTP printer and pushes pictures for print, can be only an Initiator while the corresponding printer can be only a Responder. However, a digital camera that can connect to other digital cameras and is able to both initiate and receive a PTP session is desired that is capable of behaving both as Initiator and Responder.

Usually, the Initiator will have a form of graphical user interface, that the user can see/browse thumbnails, select and chose an appropriate control action, and so on. Moreover, the Initiator device implements the device enumeration and transport mapping (in the case that multiple, PTP-compliant transports are supported), all in a transport specific manner. Typically, a Responder will not have a graphical user interface or multiple transport support.

PTP Sessions: In order for two PTP devices to exchange information about pictures or metadata, a PTP session has to be established. A session is a logical connection between the PTP devices, over which the object identifiers, or ObjectHandles, and storage media identifiers, or StorageIDs, are persistent. A session is considered opened after the Responder returns a valid response to the OpenSession operation requested by the Initiator. A session is closed after the CloseSession operation is completed or the transport closes the communication channel, whichever occurs first.

The only operation or data traffic allowed outside the session is the GetDeviceInfo operation and the DeviceInfo dataset. A device can issue/accept a GetDeviceInfo operation outside a session. A session is needed in order to transfer descriptors (StorageInfo, ObjectInfo, etc), images or any other objects between devices. Any data communicated between devices is considered valid unless a specific event occurs specifying otherwise.

PTP Transports & Picture Transfer Protocol over IP (PTP/IP)

PTP is actually a transport independent protocol. In its original embodiment it was designed and intended for use over the Univeral Serial Bus (USB) transport. However alternative transports can be readily implemented over local area networks. Examples include PTP over Bluetooth and PTP over IP networks (PTP/IP).

Figure 4A:
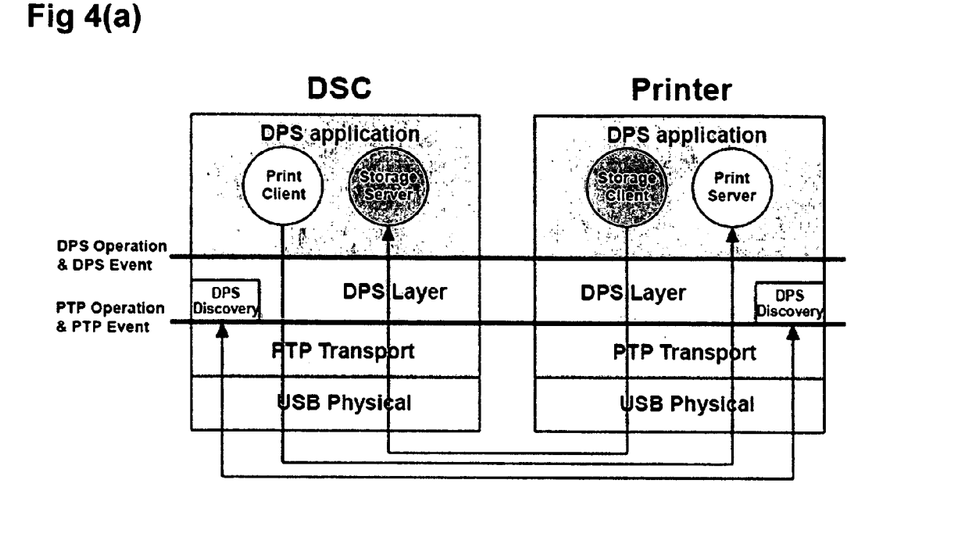
FIGS. 4(a) and 4(b) illustrate PictBridge architecture.

In PTP/IP, communication between two image devices happens via two TCP connections (logical data channels), as shown in FIG. 4(a). The first connection is dedicated to Operation Request, Response and Data transaction packets (i.e. Command/Data Connection). The second TCP connection should be used exclusively for the Event transaction packets (i.e. Event Connection). The Event packets are transported separately from the Operation and Data transaction packets because of their asynchronous nature.

The PTP/IP Command/Data TCP connection is dedicated to PTP Operation Request, Response and Data transaction packets as well as to carry PTP/IP specific packets. This connection is established by the image Initiator device and identified by the local and Responder's IP addresses and port numbers. The Responder's IP address and port number are provided through the device discovery mechanism or manually configured using a user interface on the Initiator device.

The PTP/IP Event connection is the second connection that the Initiator must open with the remote Responder. This connection is dedicated to PTP Event transaction packets. This connection is established by the image Initiator device and identified by the local and remote IP addresses and port numbers. The Responder's IP address and port number are provided through the device discovery mechanism or manually configured using a user interface on the Initiator device.

Further details are given in (i) "Digital camera connectivity solutions using the picture transfer protocol (PTP)" to Bigioi, P.; Susanu, G.; Corcoran, P.; Mocanu, I and published in IEEE Transactions on Consumer Electronics, volume 48, issue 3, p417-427, August 2002; (ii) PTP/ISO-15740 PTP Specification, available from: http://www.i3a.org/downloads_it10.html and (iii) the PTP/IP draft specification available from: https://www.fotonation.com/downloads.php each of which are now incorporated herein by reference. Note that reference (i) above also includes a detailed description of a PTP/Bluetooth transport.

PictBridge Direct Printing Services (DPS)

The PictBridge Standard (CIPA DC-001) from the Camera & Imaging Products Association (CIPA), and published in early 2003, provides a direct connect means for image input devices, such as digital cameras, and image output devices, such as printers. It achieves this by standardizing the applications services for these devices. In particular it focuses on the provision of direct print services from a camera to a printer, without the need for a USB master devices such as a desktop PC.

CIPA DC-001 takes advantage of the commonality of digital camera interfaces and data storage formats to provide an effective solution for connectivity between a single camera and a single printer. Key services offered by DC-001 compliant devices include: (i) direct printing one or more selected images on the camera UI; (ii) support for "Direct Print Ordering Format" (DPOF) based print services; (iii) index print of all images in camera; (iv) display of printer status information on the camera UI; (v) print job control functions including cancel, pause, and restart and (vi) additional features which require advanced print setup, such as multiple print copies, image crop prior to print, and/or specify image print size.

Figure 4B:
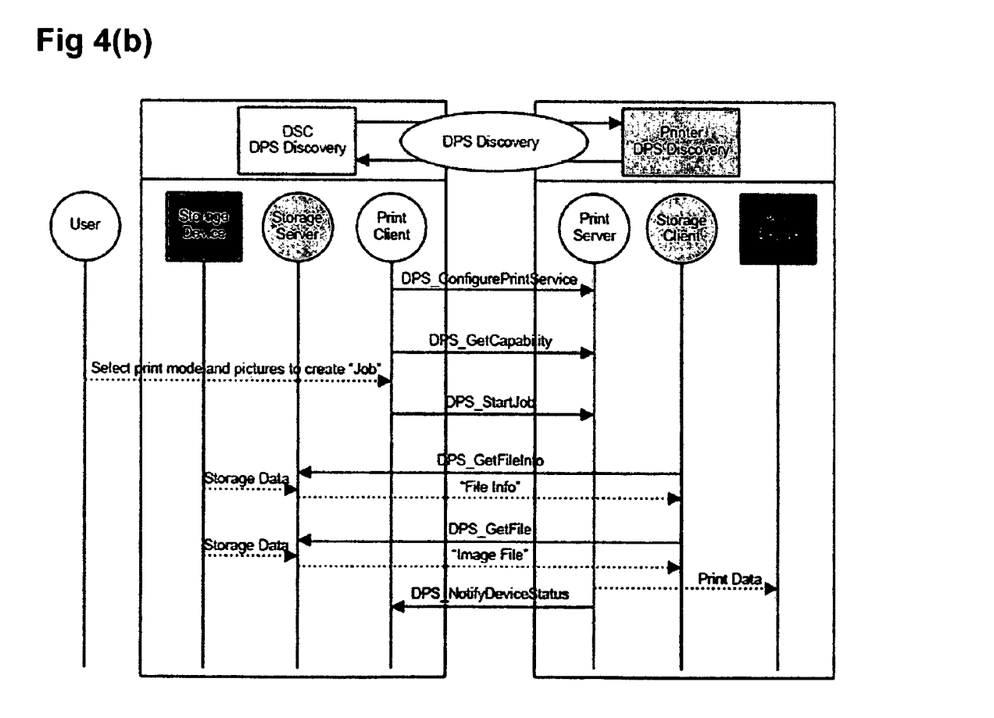

CIPA DC-001 uses PTP to provide the low-level functions and services which are required to support the higher-level functionality of PictBridge. This is illustrated in FIG. 4(b). It is also remarked that PictBridge functionality can be easily extended to a TCP/IP network by replacing the PTP/USB transport with PTP/IP.

OTHER RELATED ART

US Patent Application 2004/0146057 to Yi, Kyounghoon et al describes a user interface conversion system and method capable of supporting various devices. The user interface conversion system includes a control device for controlling predetermined devices residing on a home network, and a gateway for generating an integrated user interface based on neutral user interfaces of the devices residing on the home network at the request of a user for controlling the devices and converting the generated user interface into a specific user interface so that the integrated user interface can be supported in a specific client of the user.

Yi addresses the problem that devices such as mobile phones or PDAs, which recently gained wide public exposure but have limited computer performance and UI display capability, have difficulty in properly executing a web browser or displaying HTML pages for UPnP based home network implementations. And it addresses a further problem in that the devices on the home network cannot be controlled in a case where the protocols supporting the middleware are not compatible with one another even though the middleware should be used for searching and controlling the device operating on the home network.

US Patent Application 2004/0223060 to Tomonaga describes a "control system, control method, printing system, and image data control apparatus and program". This invention provides a control system which can be easily operated even by a user inexperienced in handling external devices such as PCs, control devices and printers, and in which compatibility between these devices can be readily achieved. The control system includes: a first external device having a receiving unit for receiving a program, the first external device capable of operating based on the received program; a second external device capable of operating in association with a command, which is generated from the first external device on the basis of the program received by the first external device; and a control device. When it is determined that the first and second external devices are controllably connected, the control device selects a program to allow the first and second external devices to be operatively associated with each other and transmits the selected program to the first external device. The second external device is controlled by the command generated from the first external device.

US Patent Application 2004/0221044 to Rosenbloom et al describes a "system and method for facilitating communication between a computing device and multiple categories of media devices". The method and system also facilitate communication between a computing device and one of a plurality of types of media devices. The system includes device retrieval modules controlled by the computing device for retrieving information from a group of device data sets controlled by the media device. The device data sets including a device information data set that includes a set of properties specific the type of media device. The computing device also includes object retrieval tools for retrieving object information from a group of object data sets stored on the media device and control command modules controlling objects on the media device.

In particular Rosenbloom addresses a need to facilitate communication between computing devices and other types of media devices. Such devices may include cell phones with or without integrated cameras, digital audio players, digital video players, digital video cameras with still imaging capability, personal digital assistants (PDAs), digital voice recorders, and other types of media devices, or any combinations of the preceding devices. Ideally, a protocol would define mechanisms for describing, configuring and controlling the media device, as PTP does for digital still cameras. A protocol is needed for defining how various media, such as photos, audio/music, and video and other media having associated rich metadata can be transferred to and from a device.

Shortcomings of the Related Art for Networked Digital Media Appliances

Although UPnP provides much of the required functionality to allow control of multiple media appliances it also imposes a significant overhead on devices in terms of computational resources. In practice, it typically imposes a requirement for a master control point to be implemented on a fixed device with significant computational capabilities and resources. Thus, in practical terms, UPnP does not provide a solution for emerging mobile media devices exemplified by the MP3 and camera devices which are presently being integrated into mobile phones.

PTP provides a more useful means of supporting low or restricted-resource devices such as digital cameras which, although they may contain quite low power CPU's and are capable of substantial computational processing, such resources are directed very specifically to their media-related capabilities and may not be available to support the requirements of a complex home networking middleware protocol. PTP also supports a simple, yet effective abstraction of the required functionality for master/slave device control and may be readily extended to function transparently over TCP/IP, Bluetooth and networks based on other protocols simply by substituting the underlying USB transport layer. However PTP, on its own cannot support device interaction between multiple networked media appliances.

PictBridge offers a higher level solution, based on a PTP infrastructure, to directly control a printer from a digital camera user interface. In effect it establishes two PTP connections so that both devices are initiators and responders. Thus the printer acts as an initiator to obtain images from a DPS storage server on the camera; conversely, the camera acts as an initiator which controls the printer server. This is illustrated in FIG. 4. However PTP relies on the highly standardized features of digital camera user interfaces and for this reason it cannot support non-standard interactions between a camera and a printer. Further, it does not propose any methods to allow multiple devices be controlled from the same user interface device, or any means to allow media processing functionality from different devices to be combined and for such combination of device functionality to be presented to an end-user in a natural and intuitive manner.

SUMMARY OF THE INVENTION

A method of operation of a server device connected within a network of media processing devices is provided. The method includes initiating respective connections with one or more media processing devices. A connection request is received from an initiating media processing device and responded to by providing a list of said connections between said initiating media processing device and one or more responder media processing devices. Device information is requested and received from each connected media processing device and received. The device information defines a user interface for each media processing device.

A further method is provided for operation of a graphical user interface appliance. A connection to a server device is provided. Device information is received from the server device for one or more media processing devices connected to the server device. The device information defines a user interface for each respective media processing device. A user interface is constructed based on the user interface information for each connected media processing device.

A server device is also provided for being connected within a network of media processing devices. The server device includes a router, and connection and user interface manager program modules. The router initiates respective connections with one or more media processing devices. The connection manager program module receives and responds to a connection request from an initiating media processing device by providing a list of connections between the initiating media processing device and one or more responder media processing devices. The user interface manager program module requests and receives device information from each connected media processing device. The device information defines a user interface for each media processing device.

A graphical user interface (GUI) appliance is also provided including communication and user interface generator program modules. The communication program module provides a connection to a server device, and receives device information from the server device for one or more media processing devices connected to said server device. The device information defines a user interface for each respective media processing device. The user interface generator program module constructs a user interface based on the user interface information for each connected media processing device.

A media processing network is also provided including the server device and the graphical user interface connected by respective peer-to-peer connections.

BRIEF DESCRIPTION OF THE DRAWINGS

An embodiment of the invention will now be described, by way of example, with reference to the accompanying drawings, in which.

DETAILED DESCRIPTION OF A PREFERRED EMBODIMENT

Figure 5A:
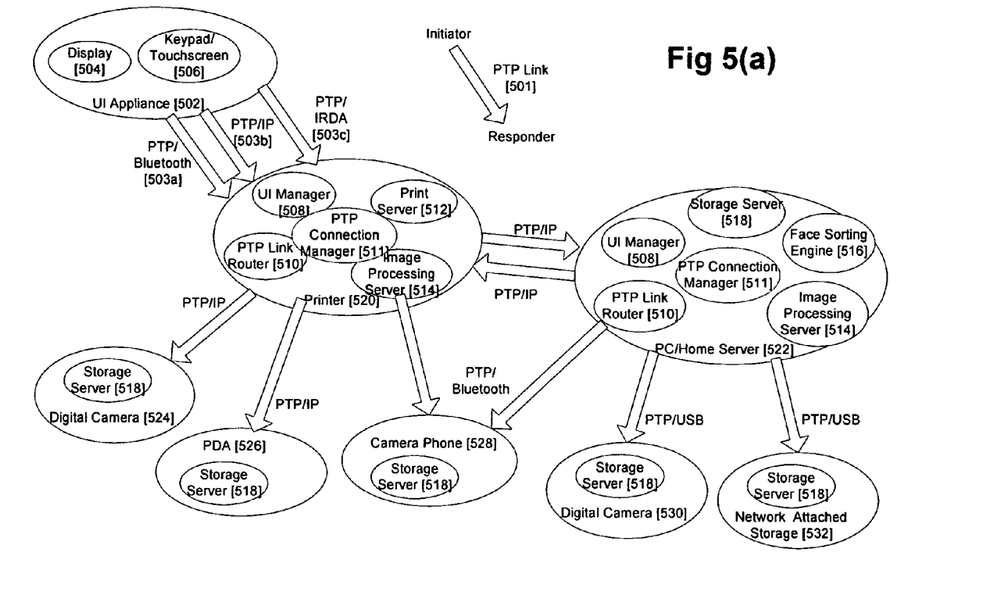
FIGS. 5(a) to 5(c) illustrate the architecture and processing performed in accordance with a preferred embodiment.
Figure 5B:
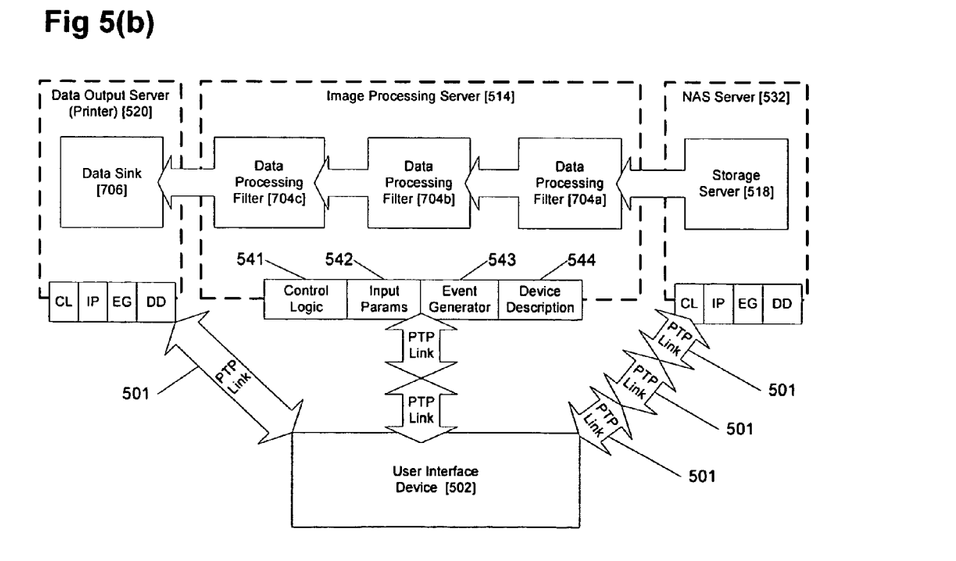
Figure 5C:
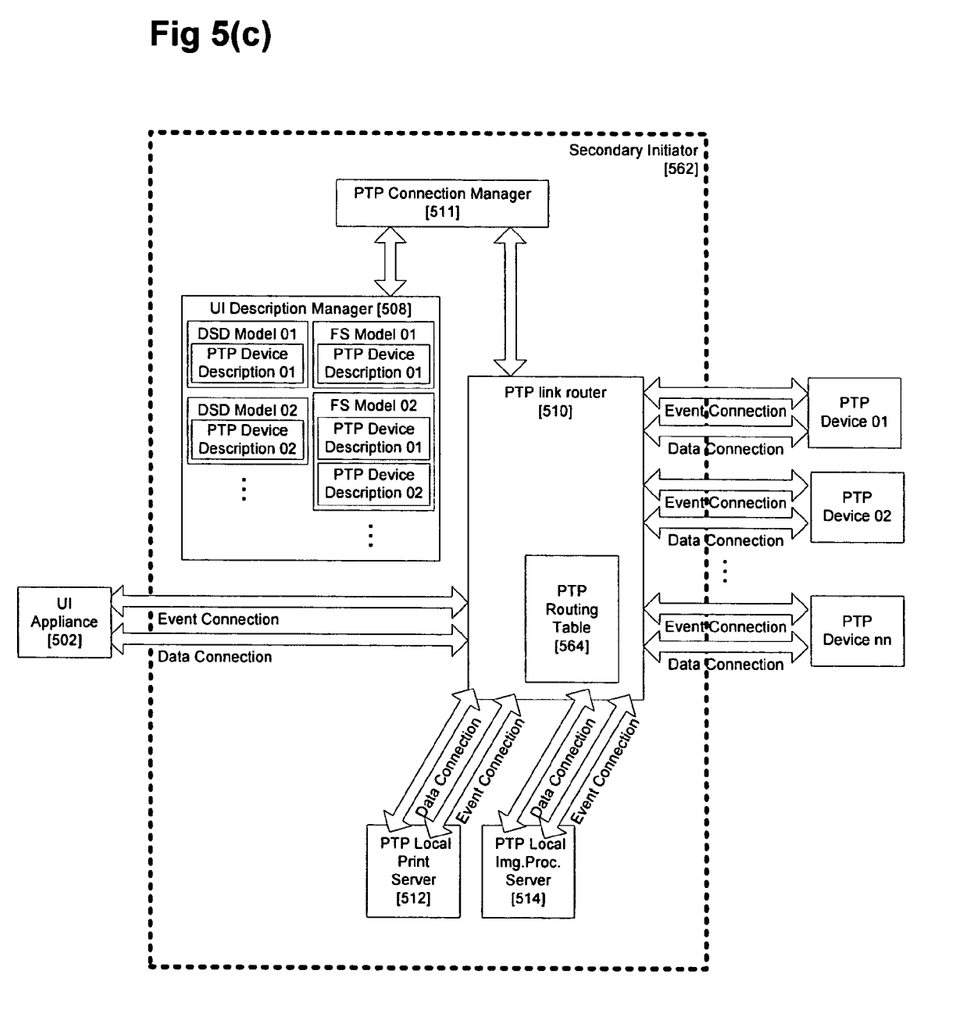

Referring now to FIGS. 5(a) to 5(c), a preferred embodiment includes components for a control and data processing infrastructure for multiple networked media peripherals of various levels of capability and sophistication based on chained device connections using a transport-layer independent asymmetric control protocol such as PTP. In addition, these components provide a UI, FIG. 6, which mirrors this chain of device connections, provides remote access to the media data distributed across said connected devices, can respond to events originating from members of the device chain and enables control and management of the underlying media processing capabilities of the connected devices.

Device Discovery

As will be appreciated by those skilled in the art, some form of discovery protocol is used in accordance with a preferred embodiment. The present specification does not explicitly describe an underlying scheme for device discovery as this can be achieved using existing conventional techniques. As well as this, the invention should be equally implementable with newly defined methods of supporting different device discovery protocols defined during ongoing developments in particular, in the PTP/IP standardization process.

Nonetheless, the base information required from any discovery protocol used with the preferred embodiment, in addition to a device addressing mechanism, includes (i) information that a device supports the establishment of PTP connections; (ii) the type of the underlying transport—IP network, Bluetooth, USB, or other and (iii) the type of device—either a data storage device (DSD), or a functional server device (FSD).

A simple functional embodiment of a discovery protocol can be achieved on a TCP/IP network by modifying the local DHCP server to support PTP connections on the default PTP/IP socket; thus PTP devices can connect to the DHCP server and obtain a list of local network devices. Each of these devices can, in turn, be queried on a pair of default PTP/IP sockets and, from the initial response the querying device may determine if the queried device is (i) able to respond to a request to establish a PTP connection; and (ii) if it is able to respond as a functional server device. Note that in this exemplary embodiment it is assumed that the underlying transport is TCP/IP. More sophisticated discovery protocols are known in the prior art and may equally well be employed by the present invention.

A more detailed description of how a device will form connections is given shortly.

Functional Server Devices (FSDs); Data/Media Storage Devices (DSD/MSDs)

Data or Media storage devices (DSD/MSDs) are PTP devices whose function is limited to storing and managing media content and to providing access to such content over a network connection. Examples include a basic PTP digital camera, PTP-enabled network storage appliances, memory card readers and networked appliances containing optical or magnetic disc storage. In essence, any device which stores digital content and is attached to a network can be enabled with PTP to act as a DSD/MSD.

Functional server devices (FSDs) are more sophisticated devices which typically can perform additional processing of digital content. Examples include image and media stream pre-processor and transcoders, printers and image rendering/display devices. In addition to their base PTP connectivity, such devices can support enhancements to standard PTP networking. In particular, each FSD contains additional software components to implement (i) PTP Link Routing and (ii) User Interface support logic and (iii) PTP connection management.

Typically such a device will determine a list of other network devices using a discovery protocol and will then query each device in turn to determine if it is another FSD, or a simpler data/media storage device (DSD/MSD). Each FSD will also know, internally, how many external PTP connections to FSDs and DSD/MSDs that it can support. Thus, once it has determined which devices are available on the local network it must then determine which of these it should connect to. In many cases this will be decided based on the media types that the FSD can handle. For example, a FSD which incorporates functional servers to support printing and image processing filters would not seek to connect to a DSD/MSD which only contained audio data.

Turning now to the components of an FSD which provide the above functionality in the preferred embodiment:

PTP Connection Manager Module

This software component performs the function of determining which network devices to connect to and is also responsible for managing new PTP connections and disconnections, and the maintaining of existing connections.

PTP Link Router (PTP-LR)

The function of the PTP Link Router is to route PTP commands, data and events between a device on which the PTP-LR is running (hereafter, referred to as the current device) and other connected PTP devices. Typically a PTP link router (PTP-LR) will respond to a single PTP connection established by another PTP Device which acts as a Primary Initiator or a UI Appliance [502] and sets up a routing table for that connection. The PTP-LR communicates with the PTP Connection Manager to determine the established connections from the current device and any pre-established PTP connections from the current device may be added to the routing table for that Primary Initiator either automatically or based on predetermined criteria or user selection. Where any one of the connections is to another FSD, the PTP-LR on the current device makes an enquiry of the instance of PTP-LR running on the other FSD to determine its established connections. This recursion continues until the last PTP-LR in a chain has no further connected FSD's to check. It then returns its routing table connections to its initiating FSD and so on until the primary initiator receives a complete list of devices it can connect to across the network.

In setting up this chain, each instance of PTP-LR is able to determine and deal with later requests from initiators, either by requesting information directly from devices connected to the current device, or by passing requests to a PTP-LR on a connected FSD.

In certain embodiments a device may support multiple primary initiators and in this case either multiple instances of the PTP link router module each having a single routing table or multiple instances of the routing table within a single instance of PTP-LR can be created. In any case, each routing table is associated with a particular primary initiator connected to the current device.

Note that any PTP connections that are added to the routing table for a primary initiator are preferably connections which were, in turn, initiated from the current device. The current device is thus referred to as a Secondary Initiator and we can understand from the above description that multiple Initiator devices can be added to a PTP link chain. On each such device a PTP-LR routing table associated with the Primary Initiator will be activated.

Non-FSD devices which are added to this PTP link chain will only be able to act as responders to their local Initiator and thus will terminate that branch of the PTP link chain in a natural manner. Other FSD devices which are connected back, either directly or indirectly, to the current FSD will have such back-referenced PTP links excluded from the local routing table.

User Interface (UI) Description Manager Module

This module is active on any FSD which can act as a Secondary Initiator. It is used as local data store of device description information from PTP devices which are connected to the current device. When a Primary Initiator or another Secondary Initiator connects to the current device, the data structures which are stored in the UI Description Manager Module are exposed and selectively exported to these Initiators.

Further, when the current device forms a new PTP connection to an external device, it loads a device description from that external device and stores a local copy in an appropriate data structure within the system memory or data storage allocated to the UI Description Manager module. Appropriate device descriptions from the current device are also incorporated into the data structures handled by the UI Description Manager module. These data structures essentially mirror the device descriptions and media processing functionality of the current device and each of the FSDs which are connected to the current device.

Thus, as soon as an MSD connects to an FSD, its device description and media processing functionality will be replicated across all UI Description Manager modules on the network. Thus, any primary initiator may retrieve device description and media processing functionality information for any device to which it can connect across the network from a connected FSD acting as a secondary initiator.

Figure 3A:
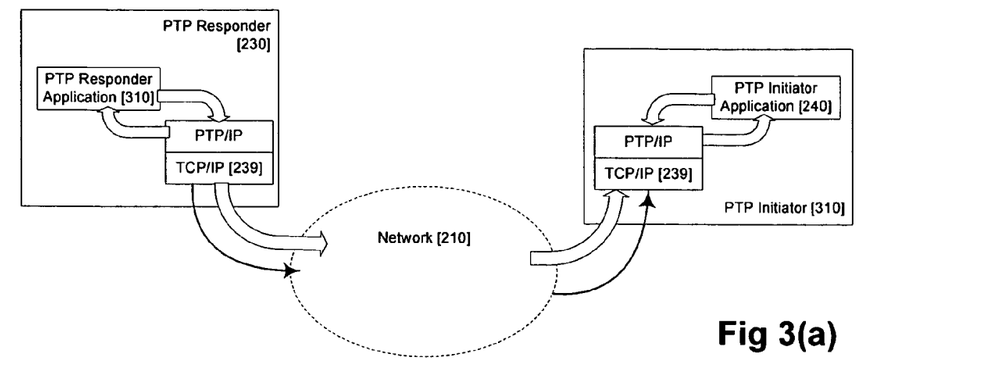
FIGS. 3(a) to 3(c) illustrate PTP architecture.
Figure 3B:
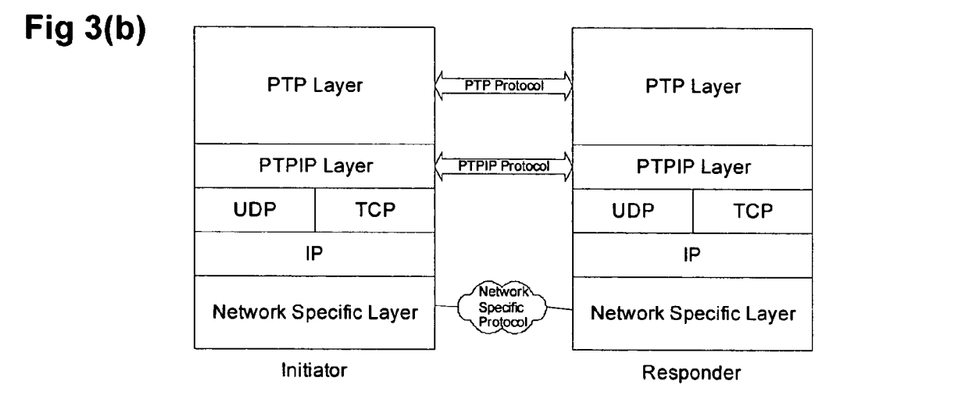
Figure 3C:
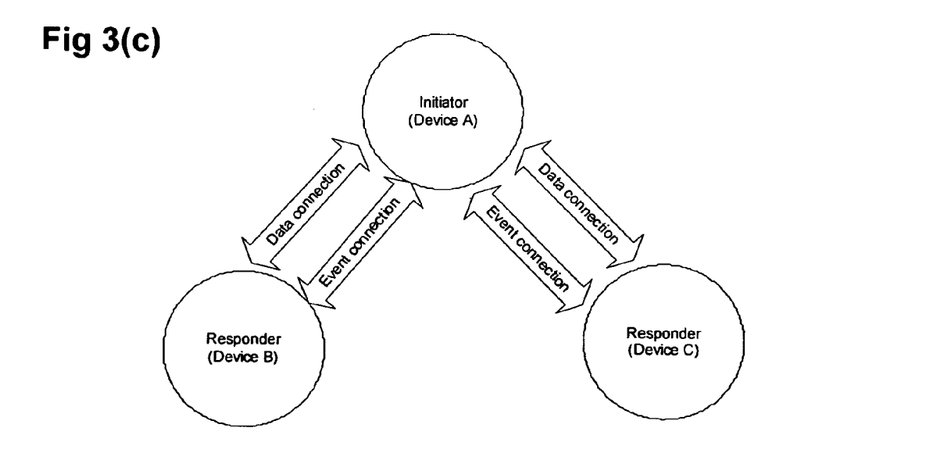

Illustrative Description of the Operation of Network in Accordance with a Preferred Embodiment FIG. 5(a) illustrates a typical home network with a series of PTP connections established over a variety of transport media (IP, Bluetooth, IRDA and USB). Each PTP connection is actually bidirectional and, for the IP transport corresponds to FIG. 3(c) comprising paired TCP sockets. However these connections are represented as unidirectional to illustrate the initiator-responder relationship implicit in each PTP link [501].

In this example the secondary initiator is a printer appliance [520] which contains the main control components of a functional server device viz, UI manager [508], PTP connection manager [511] and a PTP link router [510]. In addition this device contains a print server [512] and an image processing server [514a]. This printer appliance has formed two PTP/IP connections to DSD/MSD devices viz, a digital camera [524] and a PDA [526]. In addition, the printer has Bluetooth connectivity and has formed a connection with a camera phone [518] over a PTP/Bluetooth link. It is implicit that device discovery mechanisms are supported for both IP and Bluetooth networks and that the PTP connection manager [511] is capable of interacting with PTP devices over both transport layers. This printer [520] has also connected to a second FSD, a home computer [522] and each of these four connections is maintained by the printer's instance of PTP Connection Manager [511].

The server 522 has, in turn, created its own connection back to the printer. Thus a twin-PTP connection exists between these two devices—both can act both as initiators or responders, depending on the context. In effect four TCP socket connections are now open between these two FSDs. Fortunately, as these connections will normally be inactive apart from occasional keep-alive packets, there is little implication for network bandwidth. As was indicated previously, each device will know internally the limits on the number of TCP connections it can simultaneously support and must determine itself which devices to connect (or disconnect) to.

The home computer [522], hereafter referred to as the tertiary initiator, supports PTP connections over IP, USB and Bluetooth transports. It has formed PTP links (or connections) with a digital camera [530], a networked attached storage device [532] and the same camera phone [528] as the secondary initiator [520]. In addition to the main components of an FSD, this appliance also contains a face sorting engine [516] and an image processing server [514*b*], which may support additional functionality over that of the image processing server [514*a*] on the printer device [520].

A user interface appliance, or primary initiator [502] now connects to the printer [520]. This connection may be via different PTP transports such as Bluetooth [503*a*], TCP/IP [503*b*], IRDA [503*c*] or any other transport for which PTP support is available. The instance of PTP-LR running on the printer 520, will add identifiers for devices 524, 526, 528 and 522 to its routing table for the UI appliance. It will also request the instance of PTP-LR running on the server 522, for the routing table information it has produced for the printer as primary initiator. Thus a list containing identifiers for devices 528, 530 and 532 will be returned to the printer PTP-LR. The duplicate identifier for device 528 can either be ignored or the route to the device through the FSD 522 can be added to the printer's instance of routing table for the UI appliance 502 in a similar manner to the routing table information for devices 530 and 532.

We remark that all FSDs are potential secondary initiators until a connection from a primary initiator is actually implemented. Once an active connection from the primary initiator is established the hierarchy of secondary and tertiary initiators is established.

We next refer to FIG. 5(*c*) where the UI description stored within the UI description manager [508] is made available to the primary initiator [502] over the PTP data connection established between the primary and secondary initiators. This may be considered as an extended PTP device description which contains (i) device descriptions and (ii) routing information for the secondary initiator itself and also for each FSD and DSD/MSD which is connected to the secondary initiator and thus has its description incorporated in the UI description manager data structure.

In this example, an initiator application (not shown) running on the UI appliance 502 is to dynamically construct a user interface according to the device description information made available by the printer UI description manager module. It is possible for another instance of an initiator application running on the appliance 502 to connect to the server 522. However, although the routing to various devices may change, the user interface descriptions made available by the server UI description manager module to the second instance of initiator application will be the same as available to the first instance of initiator application.

The instance of primary initiator application now constructs a user interface based on the extended device description [509] obtained from the secondary initiator UI description manager module. An exemplary embodiment of such a user interface is provided in FIG. 6. The user interface closely mirrors the organization of devices as either FSDs or DSD/MSDs. Accordingly, the first row of tabs in the user interface indicates the functional server devices (FSDs) which can be accessed via the secondary initiator [602]. By default the secondary initiator will, itself, be selected but the user may select other FSD devices and, having done so, the functional servers which comprise the newly selected FSD will appear in the second row of tabs [604]. When the user selects a functional server from this second row of tabs, that data processing server become persistent and is marked in bold on the UI of FIG. 6 (The persistency of a functional server can be reversed if the used deselects the functional server).

Figure 6:
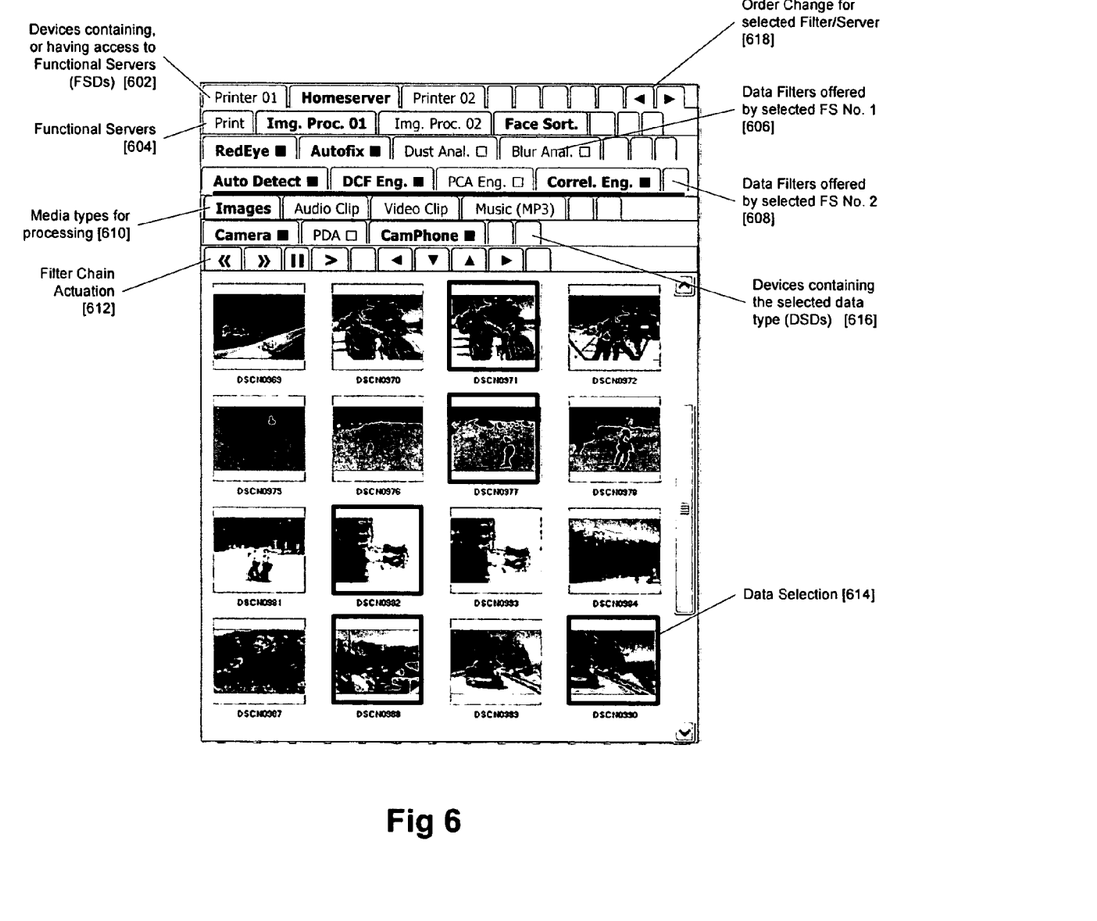
FIG. 6 shows a user interface application provided in accordance with a preferred embodiment.

After a functional server is made persistent a new row of tabs will appear below row 2 and any data processing sub-filters associated with that FSD will appear in this new row of tabs [606, 608]. These sub-filters may be selected (or deselected) by the user. The order in with these sub-filters are applied may be adjusted by an additional user selection [618]. The device description from which each functional server and sub-filter list is derived should also contain a logical processing block which indicates the input and output media types supported by each functional server and sub-filters thereof. In the example illustrated, the redeye correction and autofix subfilters have been selected from the first image processing server. The second functional server is a face-sorter which analyzes and sorts images based on the faces which occur in them. In this case automatic face detection is selected followed by analysis of the determined face regions using discrete cosine transform (DCT) analysis combined with color correlogram analysis.

The next two rows of tabs in the user interface relate to the data/media sources to be processed by the functional servers selected. The first of these rows [610] is used to select the media type to be processed by the combination of functional servers selected above. Normally a default media type can be determined and will be pre-selected. The second row of data-source related tabs [616] is then loaded with the identifier of each of the DSD/MSDs which are available via the extended device description [509] of the secondary initiator. As the user selects each device a set of PTP commands is initiated to upload content information from that device (thumbnail images in our illustrative example) over the chain of established PTP connections. When content from a device is selected, it then becomes persistent in the content selection window [614]. Accordingly, the user may cycle through each of the DSD/MSDs which support the selected media type and can select the data from each which they wish to process. A final row of tabs [612] contains actuation and control functions which can initiate, manage, adjust and control the data/media processing operations defined by the previous user selections.

An exemplary set of data/media processing operations as selected by the user interface of FIG. 6 is further described in FIG. 5(*b*) and will next be described. In this example data is sourced from the network attached storage appliance [532] connected to the PC device, or tertiary initiator [522] of FIG. 5(*a*). In order to control and manage this storage server the user interface device [502] must send commands and receive events across three PTP links. The PTP link routers on each intermediate device are responsible for managing, redirecting and mirroring PTP commands and events as appropriate.

Image processing [514] of this data occurs on the PC/home-server [522] which is controlled across two PTP links and, finally, the processed data is sent to a data output server, in this case the printer [520], where the data/media-set exits the processing chain. In this example the data output server is connected directly to the user interface device [502] it is controlled over a single PTP link [501].

Note that if the user interface appliance [502] had connected to the home-server [522], rather than the printer [520] a substantially similar user interface would have been created and substantially similar data processing operations and access to DSD/MSDs would be provided to the end user.

We further remark that, although the main data/media transfer & processing (DMTP) operations are illustrated separately in FIG. 5(b) from the command/event/device-description aspects of the PTP link they are actually implemented over the same PTP link. The main DMTP operations correspond to the data phase defined in PTP, whereas the command/event/device-description operations correspond to the command and response phases of PTP.

Referring to FIG. 5(a), networked devices such as the PTP/IP camera 524 and PDA 526 as well as PTP Bluetooth devices such as the phone 528 may benefit from being selectively connected with a specific FSD. In a simultaneously-filed, co-pending application (Ser. No. 11/156,234), entitled A METHOD FOR ESTABLISHING A PAIRED CONNECTION BETWEEN MEDIA DEVICES, there is disclosed a pairing protocol whereby on substantially simultaneous user actuation of a pairing actuator on each of an PTP initiator and a PTP responder, PTP communication is then established between the responder and the initiator.

The FSD initiator may in turn successively establish paired connections with a plurality of responders and handle these connections as virtual sessions. As also described in the above-mentioned co-pending application (Ser. No. 11/156,234), when an FSD is managing sessions with more than one initiator, it may act as a gateway by to some extent analyzing PTP packet content to retain the stateful nature of some PTP transactions and to ensure that transactions from multiple devices do not clash. If an FSD were only handling transactions between a pair of devices, then it could act as a bridge, relaying messages back and forth between devices. Furthermore, referring to FIG. 5(a), there are a number of PTP/USB devices 530,532 which have a hardwired peer-to-peer connection with a FSD 522.

As also described in the simultaneously-filed and co-pending application, entitled A METHOD FOR ESTABLISHING A PAIRED CONNECTION BETWEEN MEDIA DEVICES (Ser. No. 11/156,234), a PTP/USB to PTP/IP adapter can be provided to network enable such devices and to enable these to be more freely and flexibly paired with other PTP devices such as remote FSDs across a network and in particular a WiFi network.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments.

What is claimed is:

1. A method of operation of a server device connected within a network of media processing devices, comprising:
   initiating respective connections with multiple media processing devices;
   initiating a connection with a display, printer or rendering appliance, or combinations thereof, which itself initiates one or more connections with one or more same and/or different media processing devices;
   receiving and responding to a connection request from an initiating media processing device by providing a list of said connections between said initiating media processing device and said multiple media processing devices comprising responder media processing devices;
   requesting and receiving device information from each connected device of the multiple media processing devices, said device information defining a user interface for each of said multiple media processing devices;
   constructing a single user interface based on said user interface information for controlling more than one of said multiple connected media processing devices including at least one of said different media processing devices connected to said display, printer, or rendering appliance, or combinations thereof, wherein said user interface comprises multiple user-executable tabs indicating:
      multiple functional server devices that are accessible via at least one secondary server device;
      any data filters offered by a selected functional server;
      media types for processing; and
      any devices containing a selected data type;
   connecting a chained series of peer-to-peer connections between said initiating processing device and said responder media processing devices via at least one server device and said at least one secondary server device comprising a same or different display, printer, or rendering appliance, or combinations thereof; and
   requesting and receiving from the secondary server device a list of media processing devices connected to the secondary server device;
   requesting and receiving from the connected secondary server device information defining a user interface for said media processing devices connected to said secondary server device;
   arranging network transport of a unit of digital media from a media source or storage device, or both, to at least one media filtering device or media conversion device, or both;
   actuating a media filtering or conversion operation, or both, on said media filtering device or media conversion device, or both;
   arranging network transport of a filtered or converted version, or both, of said unit of digital media from the at least one media filtering device or media conversion device, or both, to at least one same or different media display, print, or rendering device, or combinations thereof; and
   actuating an associated display, print or rendering function, or combinations thereof.

2. A method as claimed in claim 1 wherein at least one of said connections comprises a peer-to-peer connection between said media processing device and said server device.

3. A method as claimed in claim 1 wherein at least one of said connections comprises a chained series of peer-to-peer connections between said media processing device and said server device via at least one secondary server device.

4. A method as claimed in claim 1, further comprising:
requesting and receiving from a connected secondary server device a list of media processing devices connected to said secondary server device; and
requesting and receiving from said connected secondary server device information defining a user interface for said media processing devices connected to said secondary server device.

5. A method as claimed in claim 1, further comprising:
responding to a request from an initiating media processing device to provide said device information for each connected media processing device to said initiating media processing device.

6. A method as claimed in claim 1, wherein said device information further defines media processing functionality.

7. A method as claimed in claim 6, further comprising:
providing media processing functionality; and
responding to a request from an initiating media processing device by providing device information defining said media processing functionality to said initiating media processing device.

8. A method as claimed in claim 7, wherein said device information defines control commands and input parameters for said media processing functionality and events provided by said media processing functionality, and wherein the method further comprises:
receiving control commands and input parameters from said initiating media processing device;
providing said control commands and input parameters to said media processing functionality;
receiving events provided by said media processing functionality; and
providing said events to said initiating media processing device.

9. A method of operation of a graphical user interface appliance, comprising:
providing a connection to a server device;
receiving device information from the server device for multiple media processing devices connected to said server device, said device information defining a user interface for each respective media processing device;
receiving further device information from an image rendering appliance for at least one different media processing device connected to said image rendering appliance, said further device information defining a user interface for said at least one different media processing device;
constructing a single user interface based on said user interface information for controlling more than one of said multiple connected media processing devices including at least one media processing device that is connected to said server device and said at least one different media processing device connected to said image rendering appliance, wherein said user interface comprises multiple user-executable tabs indicating:
multiple functional server devices that are accessible via at least one image rendering appliance;
any data filters offered by a selected functional server;
media types for processing; and
any devices containing a selected data type;
connecting a chained series of peer-to-peer connections between said at least one media processing device and said at least one different media processing device via said at least one server device and said image rendering appliance;
requesting and receiving from the image rendering appliance a list of media processing devices connected to the image rendering appliance;
requesting and receiving from the image rendering appliance information defining a user interface for said media processing devices connected to said image rendering appliance;
arranging network transport of a unit of digital media from a media source or storage device, or both, to at least one media filtering device or media conversion device, or both;
actuating a media filtering or conversion operation, or both, on said media filtering device or media conversion device, or both;
arranging network transport of a filtered or converted version, or both, of said unit of digital media from the at least one media filtering device or media conversion device, or both, to at least one media display, print, or rendering device, or combinations thereof and
actuating an associated display, print or rendering function, or combinations thereof.

10. A method as in claim 9, further comprising:
receiving device information from the server device defining media processing functionality available via said server, said device information including control commands and input parameters for said media processing functionality and events provided by said media processing functionality;
providing control commands and input parameters to said server in response to user interaction with said user interface;
receiving events from said server provided by said media processing functionality; and
updating said user interface according to said received events.

11. The method of claim 10, further comprising:
indicating each server device to which said appliance is connected;
indicating media processing functionality available on each server device;
indicating each media processing device to which each server device is connected; and
indicating media stored on said media processing devices.

12. A method as in claim 11, further comprising responding to user interaction to display respective indicators of media stored on a user selected media processing device.

13. A method as in claim 12, further comprising responding to user interaction to request user selected media processing functionality of user selected media stored on a user selected media processing device.

14. A method as in claim 13, wherein said media processing functionality comprises a user selected series of filtering operations.

15. One or more processor readable storage devices having processor readable code embodied thereon, said processor readable code for programming one or more processors to perform a method of operation of a server device connected within a network of media processing devices, the method comprising:
initiating respective connections with multiple media processing devices;
initiating a connection with a further appliance which itself initiates a connections with at least one different media processing device;
receiving and responding to a connection request from an initiating media processing device by providing a list of said connections between said initiating media processing device and said multiple media processing devices comprising responder media processing devices;

requesting and receiving device information from each connected device of the multiple media processing devices, said device information defining a user interface for each of said multiple media processing devices;

constructing a single user interface based on said user interface information for controlling more than one of said multiple connected media processing devices including said at least one different media processing device, wherein said user interface comprises multiple user-executable tabs indicating;

multiple functional server devices that are accessible via at least one secondary server device;

any data filters offered by a selected functional server;

media types for processing; and any devices containing a selected data type;

connecting a chained series of peer-to-peer connections between said initiating processing device and said responder media processing devices via at least one server device and said at least one secondary server device comprising a display, printer or rendering appliance, or combinations thereof;

requesting and receiving from the secondary server device a list of media processing devices connected to the secondary server device;

requesting and receiving from the connected secondary server device information defining a user interface for said media processing devices connected to said secondary server device;

arranging network transport of a unit of digital media from a media source or storage device, or both, to at least one media filtering device or media conversion device, or both;

actuating a media filtering or conversion operation, or both, on said media filtering device or media conversion device, or both;

arranging network transport of a filtered or converted version, or both, of said unit of digital media from the at least one media filtering device or media conversion device, or both, to at least one same or different media display, print, or rendering device, or combinations thereof; and actuating an associated display, print or rendering function, or combinations thereof.

16. A one or more storage devices of claim 15, wherein at least one of said connections comprises a peer-to-peer connection between said media processing device and said server device.

17. The one or more storage devices of claim 15, wherein at least one of said connections comprises a chained series of peer-to-peer connections between said media processing device and said server device via at least one secondary server device.

18. The one or more storage devices of claim 15, the method further comprising:

requesting and receiving from a connected secondary server device a list of media processing devices connected to said secondary server device; and requesting and receiving from said connected secondary server device information defining a user interface for said media processing devices connected to said secondary server device.

19. The one or more storage devices of claim 15, the method further comprising responding to a request from an initiating media processing device to provide said device information for each connected media processing device to said initiating media processing device.

20. The one or more storage devices of claim 15, wherein said device information further defines media processing functionality.

21. The one or more storage devices of claim 20, the method further comprising:

providing media processing functionality; and responding to a request from an initiating media processing device by providing device information defining said media processing functionality to said initiating media processing device.

22. The one or more storage devices of claim 21, wherein said device information defines control commands and input parameters for said media processing functionality and events provided by said media processing functionality, and wherein the method further comprises:

receiving control commands and input parameters from said initiating media processing device;

providing said control commands and input parameters to said media processing functionality;

receiving events provided by said media processing functionality; and providing said events to said initiating media processing device.

23. One or more processor readable storage devices having processor readable code embodied thereon, said processor readable code for programming one or more processors to perform a method of operation of a graphical user interface appliance, the method comprising:

providing a connection to a server device;

receiving device information from the server device for multiple media processing devices connected to said server device, said device information defining a user interface for each respective media processing device;

receiving further device information from a display, printer or rendering appliance, or combinations thereof, for at least one different media processing device connected to said display, printer or rendering appliance, or combinations thereof, said further device information defining a user interface for said at least one different media processing device; and constructing a single user interface based on said user interface information for controlling more than one of said multiple connected media processing devices including at least one media processing device that is connected to said server device and said at least one different media processing device connected to said display, printer or rendering appliance, or combinations thereof, wherein said user interface comprises multiple user-executable tabs indicating:

multiple functional server devices that are accessible via at least one display, printer, or rendering appliance, or combination thereof;

any data filters offered by a selected functional server;

media types for processing; and any devices containing a selected data type;

connecting a chained series of peer-to-peer connections between said at least one media processing device and said at least one different media processing device via said at least one server device and said display, printer or rendering appliance, or combinations thereof;

requesting and receiving from the printer appliance a list of media processing devices connected to the display, printer or rendering appliance, or combinations thereof;

requesting and receiving from the display, printer or rendering appliance, or combinations thereof, information defining a user interface for said media processing devices connected to said display, printer or rendering appliance, or combinations thereof;

arranging network transport of a unit of digital media from a media source or storage device, or both, to at least one media filtering device or media conversion device, or both;

actuating a media filtering or conversion operation, or both, on said media filtering device or media conversion device, or both;

arranging network transport of a filtered or converted version, or both, of said unit of digital media from the at least one media filtering device or media conversion device, or both, to at least one same or different media display, print, or rendering device, or combinations thereof; and actuating an associated display, print or rendering function, or combinations thereof.

24. The one or more storage devices of claim 23, the method further comprising:

receiving device information from the server device defining media processing functionality available via said server, said device information including control commands and input parameters for said media processing functionality and events provided by said media processing functionality;

providing control commands and input parameters to said server in response to user interaction with said user interface;

receiving events from said server provided by said media processing functionality; and updating said user interface according to said received events.

25. The one or more storage devices of claim 24, the method further comprising:

indicating each server device to which said appliance is connected;

indicating media processing functionality available on each server device;

indicating each media processing device to which each server device is connected; and indicating media stored on said media processing devices.

26. The one or more storage devices of claim 25, the method further comprising responding to user interaction to display respective indicators of media stored on a user selected media processing device.

27. The one or more storage devices of claim 26, the method further comprising responding to user interaction to request user selected media processing functionality of user selected media stored on a user selected media processing device.

28. The one or more storage devices of claim 27, wherein said media processing functionality comprises a user selected series of filtering operations.

29. A networked control point appliance, comprising
(a) a user interface subsystem;
(b) a user input subsystem;
(c) a user interface configuration that is determined dynamically from a plurality of devices registered on the network; and
(d) a control point subsystem;
(e) wherein the user interface configuration includes a user interface component associated with each of the plurality of devices, and
(e2) wherein said user interface configuration comprises multiple user-executable tabs indicating;
multiple functional server devices that are accessible via at least one control point subsystem;
any data filters offered by a selected functional server;
media types for processing; and
any devices containing a selected data type;
(f) wherein the plurality of devices comprises
(i) a media source or storage device or both;
(ii) a media display, print or rendering device, or combinations thereof; and
(iii) a media filtering device or media conversion device, or both; and
(g) wherein responsive to a first user selection of a unit of digital media on the media source or storage device, or both, a second user selection of at least one media filtering device or media conversion device, or both, and a third user selection of at least one media display, print or rendering device, or combinations thereof, said control point subsystem is configured to:
(1) arrange network transport of said unit of digital media from the media source or storage device, or both, to the at least one media filtering device or media conversion device, or both;
(2) actuate a media filtering or conversion operation, or both, on said media filtering device or media conversion device, or both;
(3) arrange network transport of a filtered or converted version, or both, of said unit of digital media from the at least one media filtering device or media conversion device, or both, to the at least one media display, print, or rendering device, or combinations thereof; and
(4) actuate an associated display, print or rendering function, or combinations thereof.

30. The appliance of claim 29, wherein the user interface subsystem comprises a visual display screen and the user input subsystem comprises a touchscreen interface.

31. The appliance of claim 29, wherein the second user selection includes selection of at least one media filtering operation on said at least one media filtering device.

32. The system of claim 29 where the second user selection is followed by one or more additional selections of one or more media filters on said media filtering device.

33. The system of claim 29, wherein the second user selection is followed by at least one selection of an additional media filtering device, and wherein the control point subsystem is further configured to:
(5) arrange network transport from the first media filtering device to the at least one additional media filtering device, and
(6) actuate the at least one selected media filter prior to arranging network transport of the filtered media stream to the at least one media display device.

34. The appliance of claim 33, wherein the at least one selection of the additional media filtering device is followed by selection of at least one media filter on said additional media filtering device.

35. The appliance of claim 33, wherein an order of application of two or more selected media filters is predetermined within said filtering device.

36. The appliance of claim 33, wherein an order of application of two or more selected media filters comprises an order of selection by a user.

* * * * *